United States Patent

Jacob et al.

[15] 3,646,256

[45] Feb. 29, 1972

[54] ADAPTIVE MULTIPLE SPEED FACSIMILE SYSTEM

[72] Inventors: Gerald W. Jacob, Great Neck; Eugene Mogul, East Norwich; Paul Z. Boros, New York; David Schiff, Briarwood; Malcolm Reader, New Hyde Park; Ira Kamen, New York, all of N.Y.

[73] Assignee: Comfax Communications Industries, Inc., New York, N.Y.

[22] Filed: Mar. 24, 1970

[21] Appl. No.: 22,231

[52] U.S. Cl. ....................178/6, 178/DIG. 3

[51] Int. Cl. ....................H04n 3/32

[58] Field of Search....................178/6, DIG. 3, 6.6; 179/15, 179/55, 15 BV, 15 BW

[56] References Cited

UNITED STATES PATENTS 3,384,709 5/1968 Quinlan ....................178/DIG. 3

3,384,710 5/1968 Doundoulakis....................178/DIG. 3

*Primary Examiner*—Robert L. Griffin

*Assistant Examiner*—Barry Leibowitz

*Attorney*—Sandoe, Hopgood and Calimafde

[57] ABSTRACT

A facsimile transmitter comprises means for scanning a document to produce signals corresponding to the dark and light areas of the document. Those signals are transferred to the receiver at one of two predetermined rates—fast or slow—depending on the content of the document. If desired, the rate of scanning may also be varied according to that content. Signals having a low information value are thereby transmitted at a higher rate than signals having a high information content.

25 Claims, 14 Drawing Figures

INVENTORS
GERALD W. JACOB
EUGENE MOGUL
PAUL Z. BOROS
DAVID SCHIFF
MALCOLM READER
IRA KAMEN
BY
Sandoe, Hopgood & Calimafde
ATTORNEYS INVENTORS
GERALD W. JACOB
EUGENE MOGUL
PAUL Z. BOROS
BY DAVID SCHIFF
MALCOLM READER
IRA KAMEN Sandoe, Hopgood & Calimafde
ATTORNEYS INVENTORS
GERALD W. JACOB
EUGENE MOGUL
PAUL Z. BOROS
DAVID SCHIFF
MALCOLM READER
IRA KAMEN BY Sandoe, Hopgood & Calimafde
ATTORNEYS INVENTORS
GERALD W. JACOB
EUGENE MOGUL
PAUL Z. BOROS
BY DAVID SCHIFF
MALCOLM READER
IRA KAMEN Sandoe, Hopgood & Calimafde
ATTORNEYS INVENTORS
GERALD W. JACOB
EUGENE MOGUL
PAUL Z. BOROS
DAVID SCHIFF
MALCOLM READER
IRA KAMEN
BY
Sandoe, Hopgood & Calimafde
ATTORNEYS INVENTORS
GERALD W. JACOB
EUGENE MOGUL
PAUL Z. BOROS
DAVID SCHIFF
MALCOLM READER
IRA KAMEN BY Sandoe, Hopgood & Calimafde
ATTORNEYS

ADAPTIVE MULTIPLE SPEED FACSIMILE SYSTEM

The present invention relates generally to image-transmitting systems, and particularly to a facsimile-transmitting system in which the rate of transmission is determined by the content of the transmitted information.

In recent years, in an attempt to improve the flow of information between remote locations, considerable efforts and money have been expended in the development of systems for transmitting images over conventional telephone lines in a reliable, inexpensive, and relatively quick manner. In most of the known systems the document to be transmitted is scanned and appropriate signals corresponding to the subject matter on the document are produced. Those signals along with suitable synchronizing signals are transmitted to a receiver at which the process is reversed by causing a variable velocity beam, controlled by the received data signals, to scan a suitable medium to reproduce the image on that medium.

In a typical document used in commercial transactions, such as a letter, chart, record, or the like, the content of the document is usually represented in areas of one of two shades; such as dark areas formed on a light background. It is the dark areas, e.g., printed words, numbers, or curves, which convey the meaningful information. In most of the known scanning systems no distinction is made between light and dark areas in either data transmission or scanning rate. That is, information is obtained and transmitted at a uniform rate regardless of the portion of the document being scanned. Since the required bandwidth for a transmission system is determined by the maximum anticipated rate of intensity variation, the bandwidth requirements of most image transmission systems is incompatible with transmission over telephone lines. Decreasing the scanning rate would reduce the required bandwidth but would have the adverse affect of slowing down image transmission in a facsimile system.

In Doundoulakis, U.S. Pat. Nos. 3,204,026, 3,384,710 and 3,459,886 there are disclosed image data transmission systems in which the scanning rate of a television camera is continuously varied in accord with the nature of the image scanned by the camera. That is, in scanned line segments in which there are intensity variations, the scanning rate is decreased, and in segments having no transitions, the rate of scanning is increased. By means of this variable scanning operation a reduction in the required bandwidth for image transmission is achieved, while still permitting high resolution of image reproduction.

While the concepts and systems disclosed in the Doundoulakis patents have proven to be highly advantageous in reducing the bandwidth required for television transmission, it has not lend itself to optimum performance in a facsimile transmitting system. This is primarily a result of the essentially analog nature of the Doundoulakis systems, which may introduce difficulties in achieving proper synchronization between the facsimile transmitter and receiver. Moreover, there is a tendency in facsimile systems of this type for the received image to be somewhat distorted and thus not a faithful reproduction of the transmitted image.

Other known facsimile transmission systems are available but their prime drawbacks, even those systems which are able to transmit information over telephone lines, of excessive cost, complexity, and the relatively long time required to transmit a complete image, have limited their acceptance. For example, in one known facsimile transmitting system, 6 minutes or more are required to transmit and reproduce a complete letter-size document. Moreover, in other known facsimile transmitting systems, the received image suffers from poor definition and clarity.

It is therefore an object of the present invention to provide an image transmission system in which the time for transmitting a complete image is significantly reduced.

It is another object of the present invention to provide an image transmission system of the type described which utilizes digital techniques and which simplifies the synchronization between the transmitter and receiver.

It is a further object of the present invention to provide an improved facsimile transmitting system in which image signals can be transmitted over conventional telephone lines.

It is yet another object of the present invention to provide a facsimile system of the type described, in which excellent resolution is obtained in the received image.

It is still a further object of the present invention to provide a facsimile system of the type described, in which the requirements for signal storage is reduced.

It is yet a further object of the present invention to provide a facsimile transmission system in which the required bandwidth is reduced, so that the image signals may be readily transmitted over conventional telephone wires.

It is a general object of the present invention to provide a facsimile transmitting system in which image signals are processed and transmitted at a rate determined by the content of the image being transmitted.

Broadly considered, the facsimile system of the present invention processes image data signals at one of two rates—fast or slow—as determined by the content of the image being transmitted. The operation of the system is predicted on the assumption that only the dark area of a document contain meaningful content or information. The scanning process produces signals representative of the dark and light portions of the image. When a predetermined number of consecutive light elements are sensed the rate of signal processing is changed to the fast rate. Upon the subsequent sensing of a dark portion of the image, the processing rate is automatically restored to a slow rate.

If desired, the rate at which the document is scanned may be varied along with the variation in the signal processing rate, so that the light areas of the document are scanned over quickly while the dark areas are slowly scanned to ensure improved resolution of the received dark areas having the more meaningful content. Moreover, the variable data processing scanning rate permits the image of an entire document to be scanned and transmitted in a significantly shorter time, since only the dark areas are scanned and processed at the slow rate required for adequate resolution, while data processing is carried out at the higher rate over those light portions of the image having minimal content. The variation in the signal processing rate in accord with the scanned image content also serves to significantly reduce the bandwidth requirements of the system thereby providing the system of the invention with the capability of using ordinary telephone lines as the communications link between the facsimile transmitter and receiver.

To the accomplishment of the above and to such further objects as may hereinafter appear, the present invention relates to an adaptive multiple speed image data transmission system substantially as defined in the claims, and as described in the following specification taken together with the accompanying drawings in which:

Figure 2:
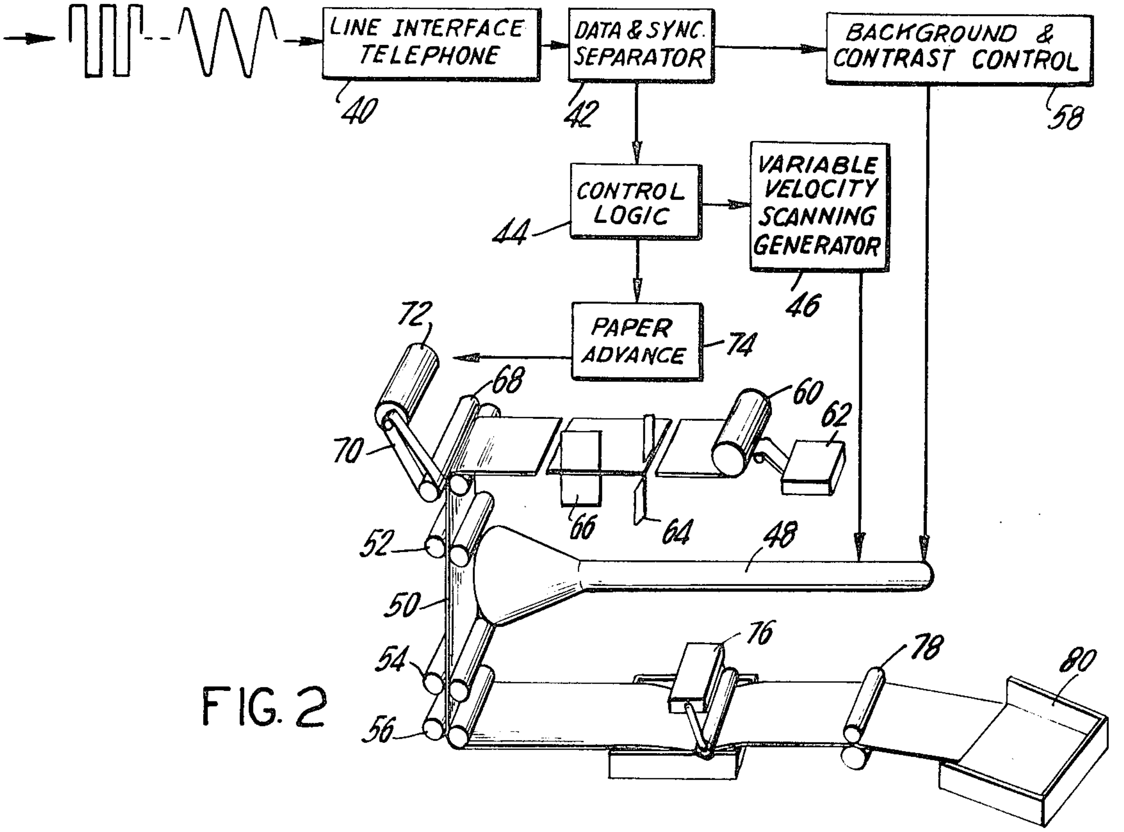
FIG. 2 is a schematic diagram similar to that of FIG. 1 of a facsimile receiver for use with the transmitter of FIG. 1.
Figure 1:
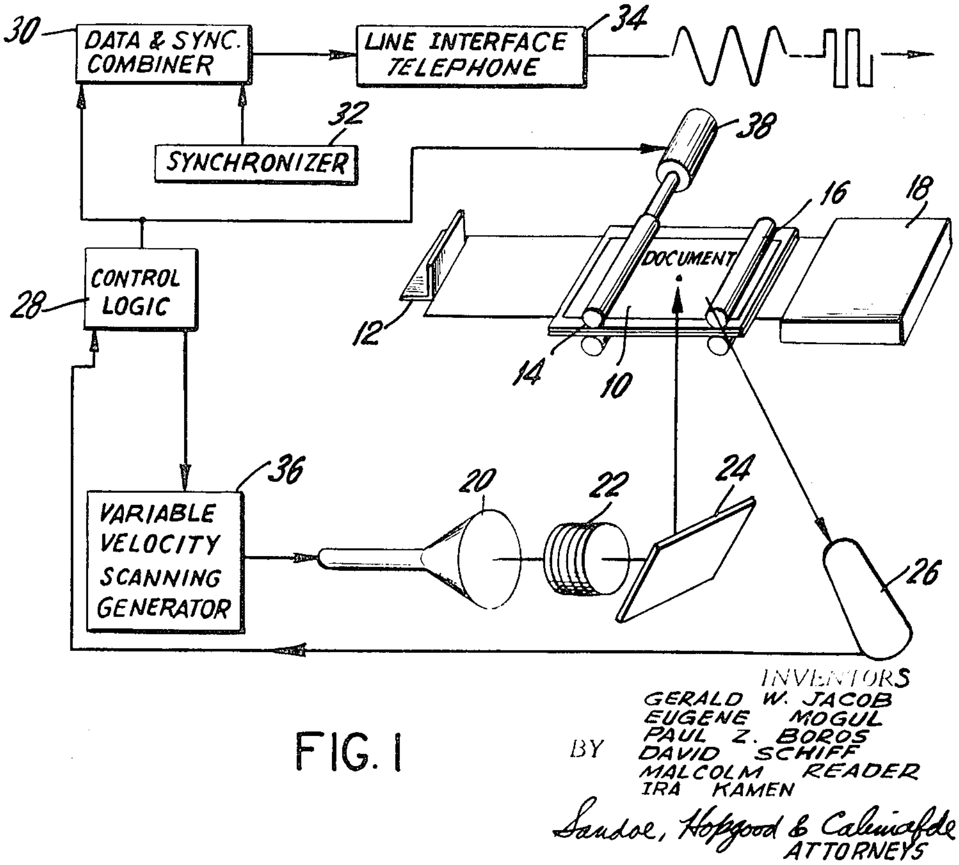
FIG. 1 is a schematic diagram of a facsimile transmitter embodying features of the present invention.
Figure 3A:
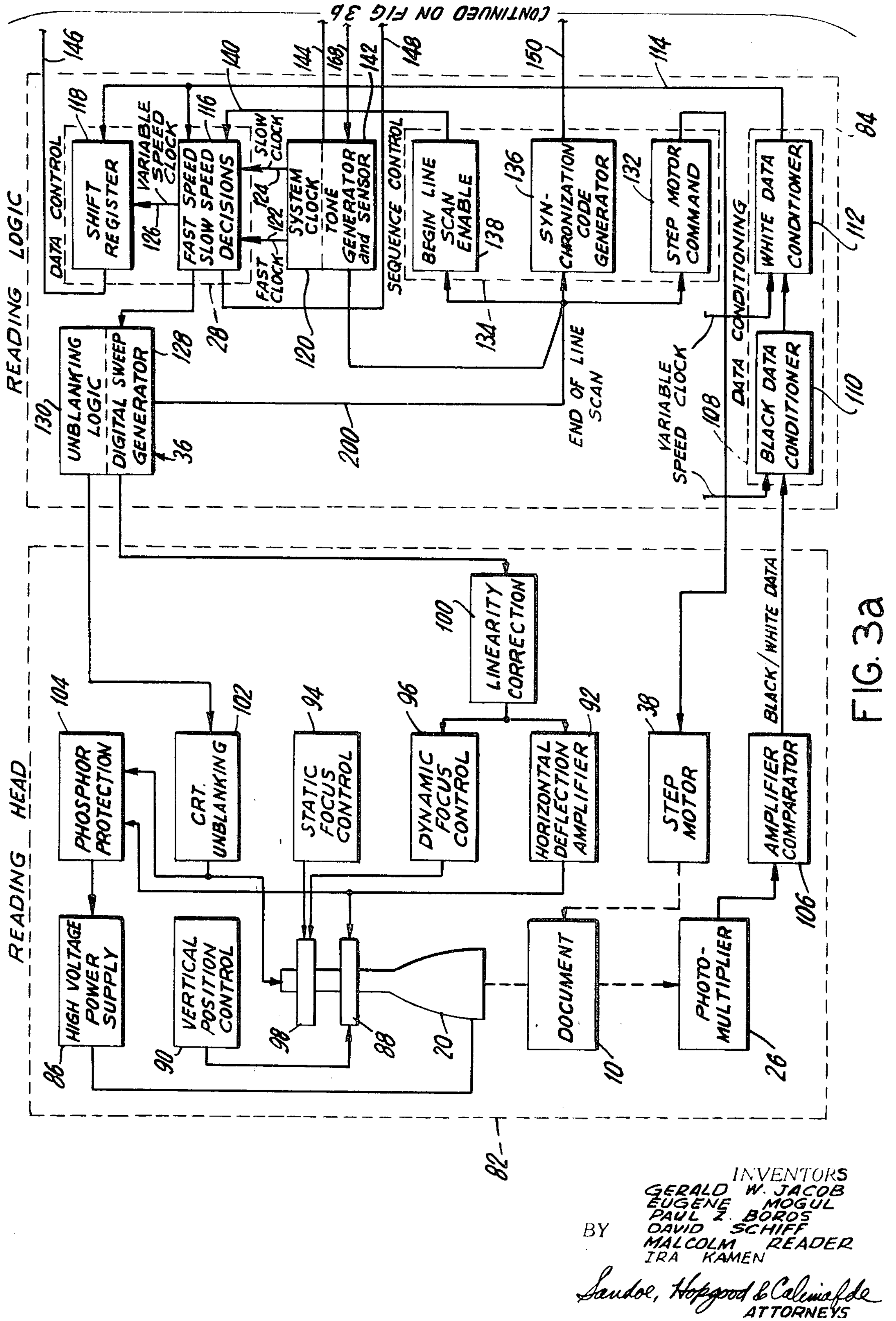
Figure 3B:
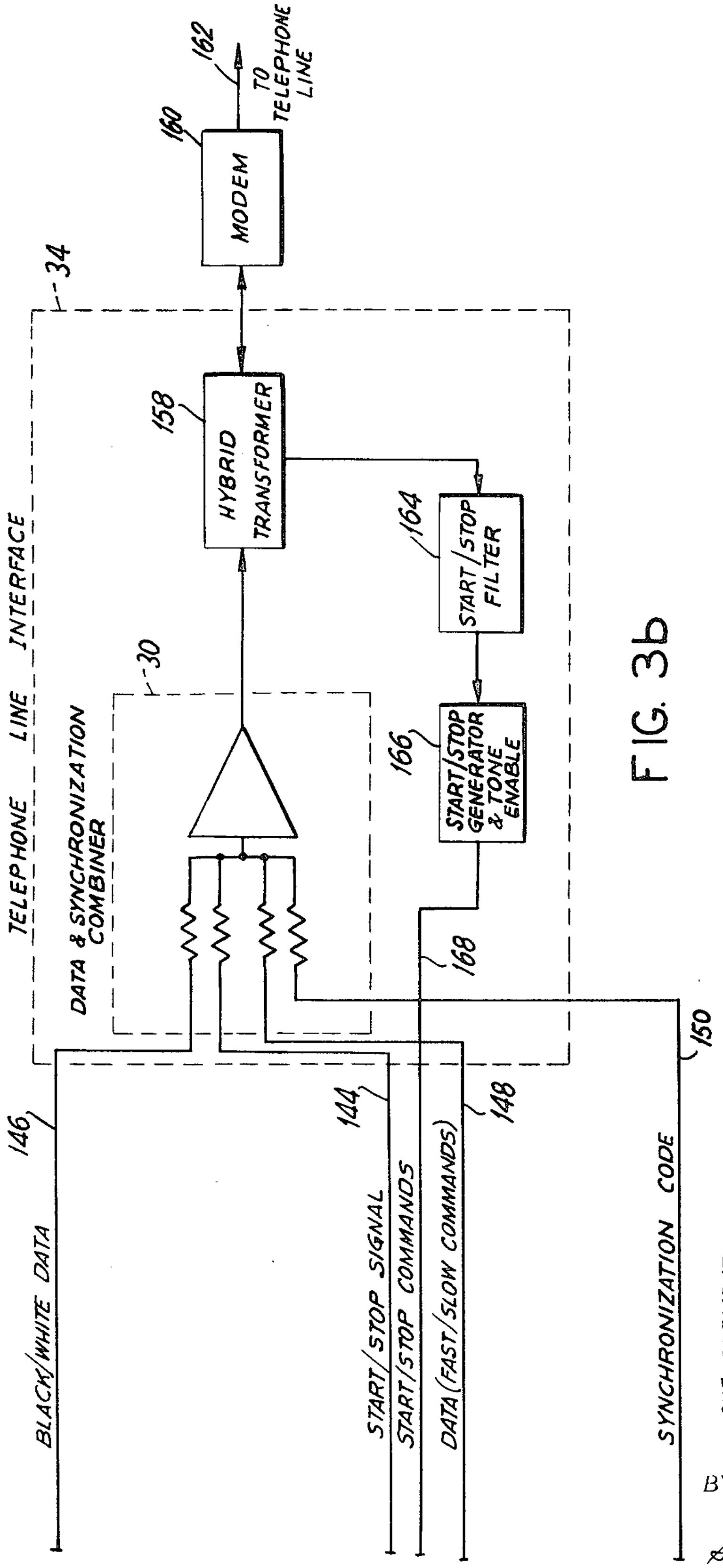
Figure 5:
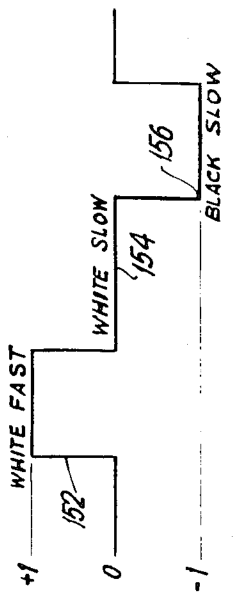
Figure 13:
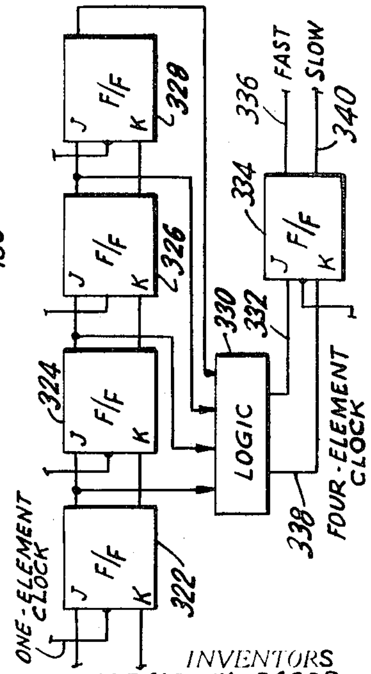
Figure 4:
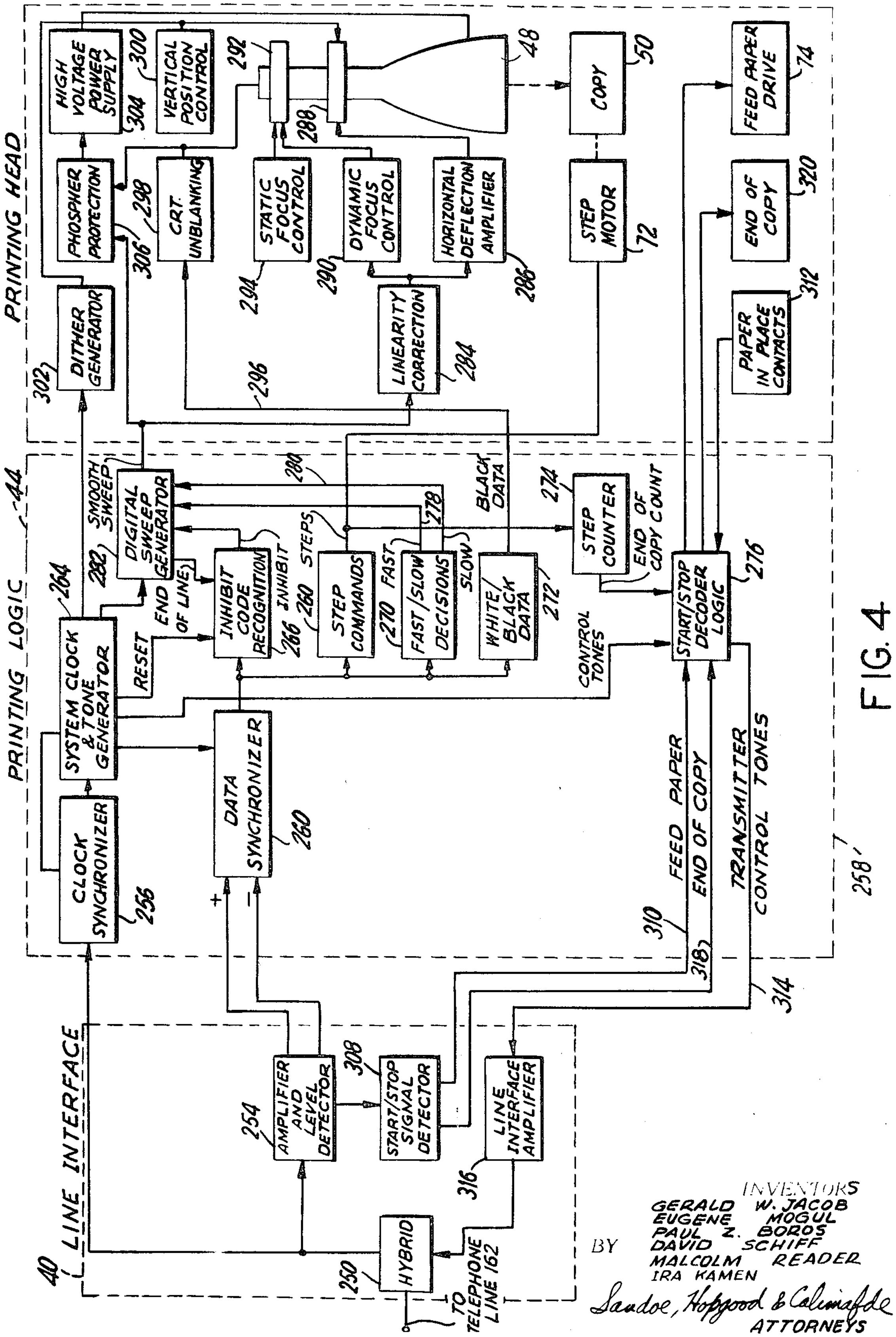
Figure 6:
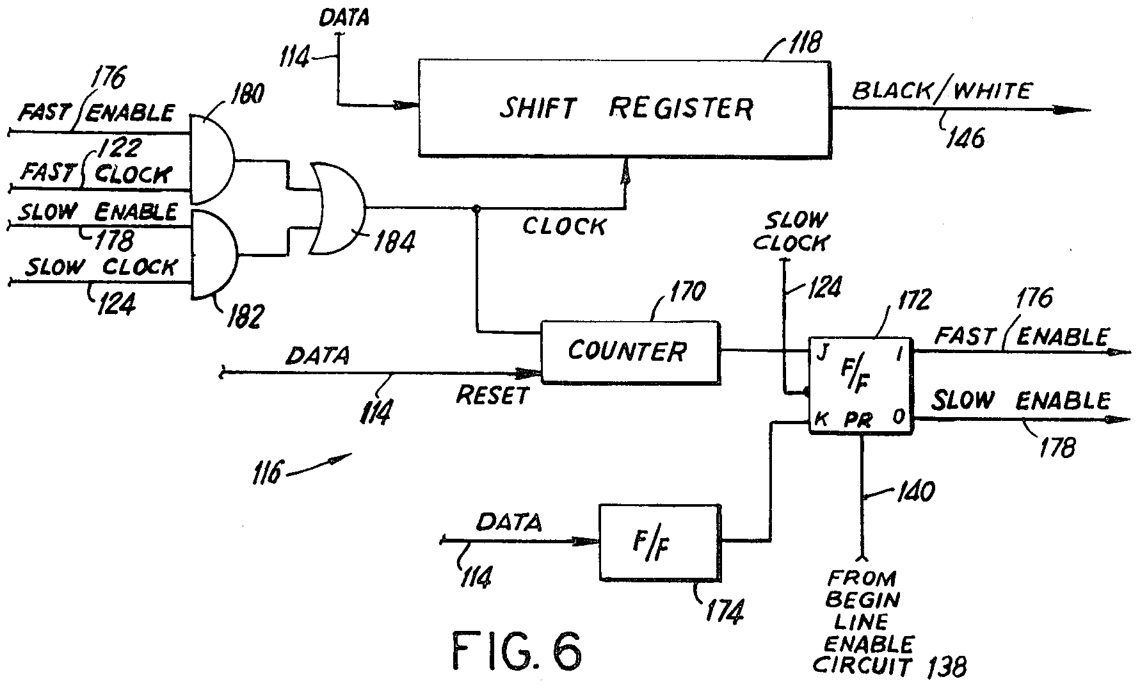
Figure 7:
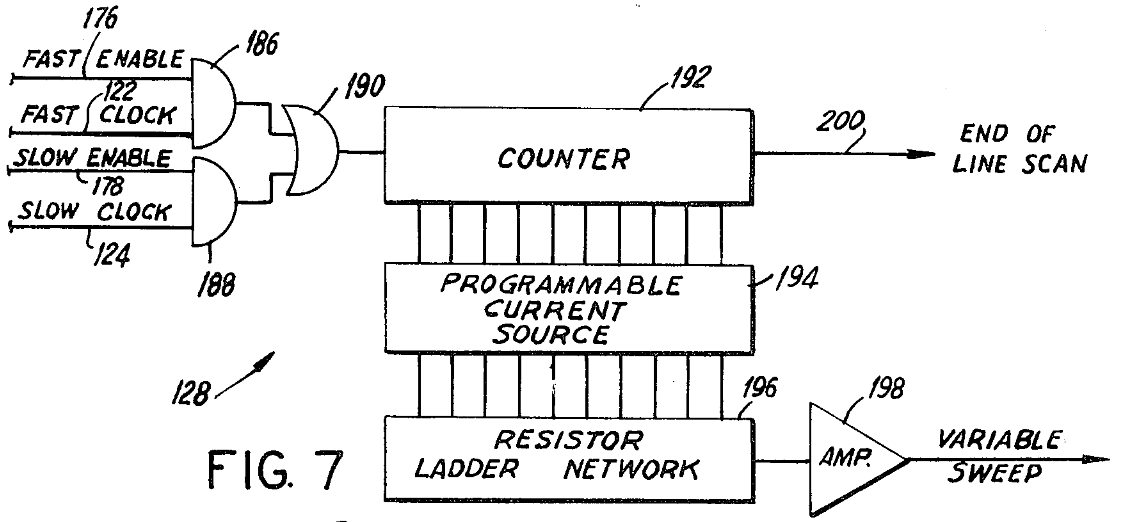
Figure 8:
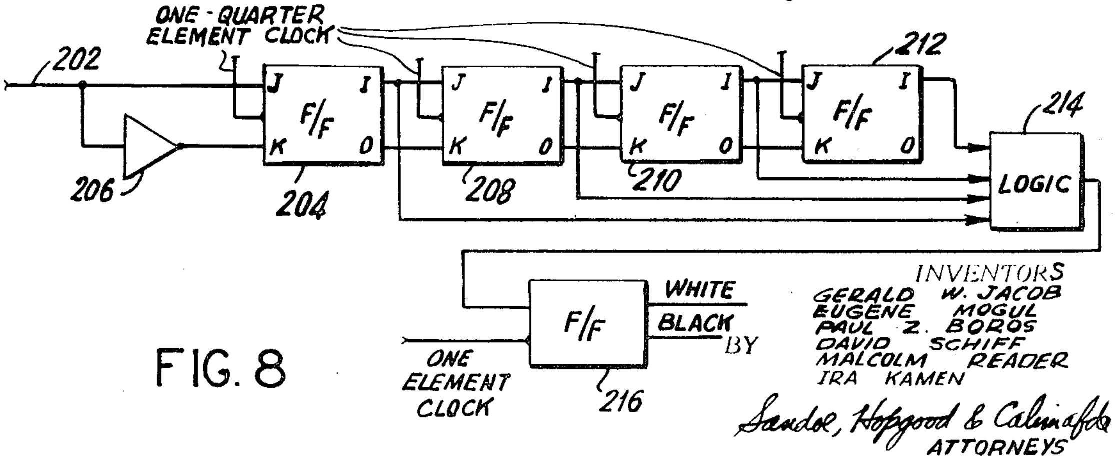
Figures 9, 10:
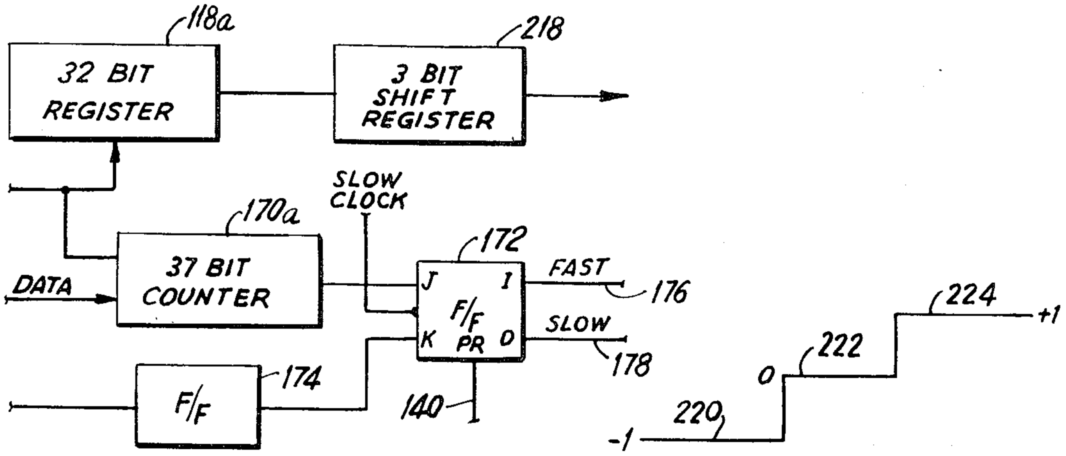
Figure 11:
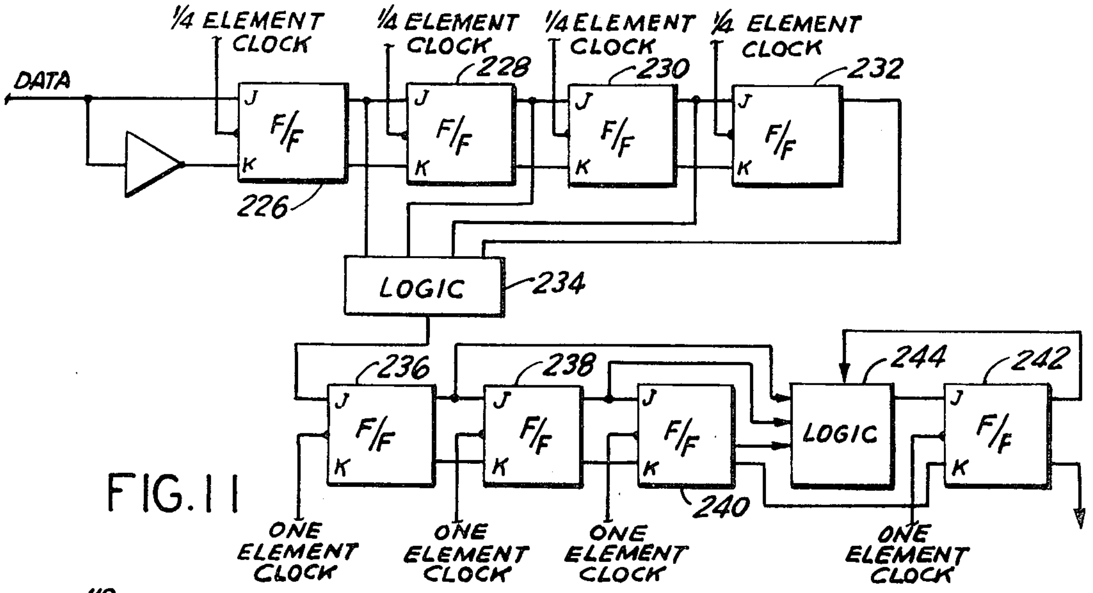
Figure 12:
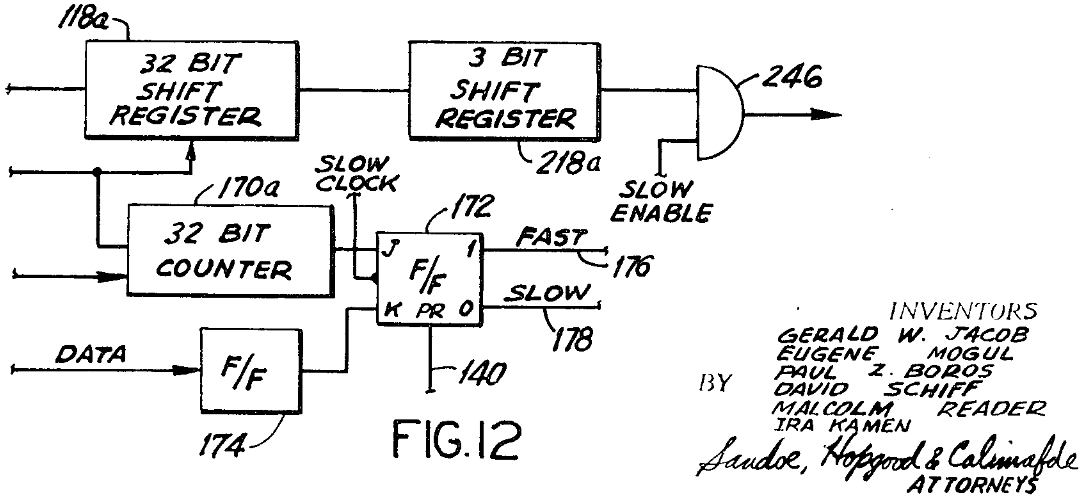

FIGS. 3*a* and 3*b* illustrate, when horizontally combined, a more detailed schematic diagram of portions of the transmitter of FIG. 1;

FIG. 4 is a schematic diagram similar to that of FIG. 3 of the receiver of FIG. 2;

FIG. 5 is a portion of a typical transmitter data waveform in accord with one embodiment of the invention;

FIG. 6 is a more detailed schematic diagram of the data control portion of the transmitter;

FIG. 7 is a more detailed schematic diagram of the digital sweep generator of the transmitter;

FIG. 8 is a more detailed schematic diagram of the transmitter data conditioner;

FIG. 9 is a view similar to FIG. 6 of a variation of the facsimile transmitter of the invention;

FIG. 10 is a typical waveform produced by the circuit of FIG. 9;

FIG. 11 is a variation of a transmitter data conditioner for use in a two-level data transmission scheme for use in the facsimile system of the invention;

FIG. 12 is another view similar to FIG. 10 for a two-level data transmission scheme; and FIG. 13 is a schematic diagram of the receiver fast/slow decode circuit for a two-level data transmission scheme.

GENERAL DESCRIPTION

Prior to a description of the electronic circuitry of the facsimile system of the invention it is believed that an understanding of the mechanical aspects of that system, which operate in cooperation with that electronic circuitry, will be helpful. FIG. 1 illustrates schematically a facsimile transmitter for sending image signals derived from a document 10 over a telephone to a facsimile receiver such as that illustrated in FIG. 2, at which those signals are processed to reproduce the image on that document. The document 10 is inserted by a feed 12 between two pair of upper and lower feeder rollers 14 and 16. Upon the completion of the document scanning and transmission, the document is transferred into a tray 18.

A light beam is scanned horizontally across document 10 by an optical system comprising a cathode ray tube 20 which produces a horizontally scanning beam. That beam is focused and narrowed by a lens system 22 onto a reflecting mirror 24 which in turn directs the scanning beam onto document 10. The narrow beam reflected from the document surface is thereafter incident upon a photomultiplier 26 which produces electrical signals in response to the intensity of the reflected beam.

The electrical signals from photomultiplier 26 are applied to an electronic control logic section 28 of the transmitter which processes image data signals in a manner more completely described below, at one of two rates corresponding to the black-white content of the portion of the document being scanned. The output data signals from logic control section 28 are applied at the selected rate to a data and synchronization combiner 30, in which they are combined with rate command signals and synchronization signals obtained from a synchronizer 32.

The combined data rate command and synchronizing signals are applied to an interface 34, wherein the signals are further processed for transmittal over a telephone line to the receiver. The receiver, as will be more completely described below, reproduces an image under the control of the data signals at a rate controlled by the rate command signal. The data rate command signal may also be coupled from logic control section 28 to a variable velocity scanning generator 36 which, in response to the rate signal command from control logic section 28, controls the rate at which the beam from cathode ray tube 20 scans the document. Control logic section 28 also comprises means for sensing when the scanning beam reaches the end of a line on the document, and thereupon sends an appropriate end-of-line signal to a stepping motor 38, which thereupon incrementally moves document 10 for the initiation of scanning on the following line. The process continues until the document is completely scanned and the data thereon is transmitted over the telephone wire to the receiver.

The receiver illustrated schematically in FIG. 2 receives the transmitted image data signals at a receiver telephone interface 40 where the incoming signals are processed and applied to a data and synchronization separator 42. The output signals from the latter are applied to a receiver control logic 44, which in turn provides operating signals to a variable velocity scanning generator 46, which in turn controls the rate at which a beam produced by a receiver cathode ray tube 48 scans across the face of a photosensitive paper sheet 50 moved perpendicularly across the direction of that beam by means of rollers 52, 54 and 56. The intensity of the scanning beam is controlled by image data signals applied to the control grid of tube 48 which signals are obtained from a background and contrast control circuit 58. The latter in turn receives the data signals from separator 42 so that the intensity of the scanning beam reflects the transmitted data received from the transmitter. Moreover, as noted above the rate at which the cathode-ray beam scans the paper or other suitable reproducing medium 50, follows the data processing and scanning rate as determined in the control logic section of the transmitter.

The paper 50 is initially stored on a roll 60. Paper from roll 60 is supplied by means of a paper feeder 62 to a cutter indicated at 64 and is charged prior to being scanned by a charger unit indicated schematically at 66. The charged paper is incrementally moved past the scanning beam by means of rollers 68, one of which is driven by a belt 70, the latter in turn being driven by a stepping motor 72. Motor 72 operates in response to a signal derived from paper-advance unit 74, which in turn operates in response to an end-of-line signal obtained from data and synchronization separator 42. The scanned paper is developed by a developer system indicated at 76, and the developed paper carrying the transmitted image is thereafter transferred by rollers 78 into a tray 80.

Facsimile Transmitter

The facsimile transmitter is illustrated schematically in greater detail in FIGS. 3*a* and 3*b* in which most of the components shown in FIG. 1 are included. The transmitter may be conveniently divided into a reading head section 82 which produces the image signals, and a reading logic section 84 in which those signals are analyzed and processed. Section 82 includes the cathode ray tube 20 which produces the scanning beam for the document at one of the two (fast or slow) rates. Suitable anode voltage for tube 20 is provided by a high-voltage power supply 86.

The vertical position of the horizontally scanning beam is controlled by a vertical deflection signal provided to the beam deflection coil 88 of tube 20 by vertical position control 90. Horizontal movement of the beam at the desired rate is controlled by horizontal deflection signals applied to deflection coil 88 from a horizontal deflection amplifier 92. Static and dynamic focus controls 94 and 96 provide signals to the focusing coil 98 of tube 20. Linearity correction signals for horizontal deflection and the dynamic focusing are provided by signals produced by a linear correction circuit 100 as is conventional. Unblanking signals are provided to the cathode of tube 20 from a conventional unblanking circuit 102.

To protect and thus prolong the useful like of tube 20, a phosphor protection 104 is provided in reading head section 82. Circuit 104 is essentially a gate which receives input signals from horizontal deflection amplifier 92 and unblanking circuit 102. When those input signals are of a sense indicating that the beam is not blanked, and the beam is not being horizontally swept, circuit 104 is operative to produce a signal which is applied to power supply 86. That signal, when present, renders power supply 86 inoperative to thereby protect, during the appropriate period, the phosphor material on the face of tube 20.

As described above, the horizontally swept beam produced by tube 20 is reflected from the surface of document 10 and is reflected to a photomultiplier 26. Document 10 has information thereon usually in dark letters, numbers of figures printed on a light background. The intensity of the reflected beam incident at photomultiplier 26 is directly proportional to the content of the scanned portion of the document. Photomultiplier 26 in a known manner in turn produces an analog electrical signal representative of the visual content (e.g., light or dark) of the scanned portion of the document.

That signal is processed in an amplifier-comparator 106 in which the output signal from photomultiplier 26 is amplified, and then compared, as in a Schmitt trigger, against a reference or threshold level. Signals above that reference level are converted into signals of one discrete level re. white, while signals below that reference level are converted to an output signal at a second discrete level re. black. The output of amplifier-comparator 106 is thus applied to the reading logic section 82 at the input of a data signal conditioner 108 which consists of a black data conditioner 110 connected in series with a white data conditioner 112. The basic unit of scanning and transmitting resolution, that is the spot size of the scanning beam of the unit to which the scanned visual image is quantized, is designated as an element. For example, to achieve adequate resolution of the received image, a single line of a conventional letter size document may be quantized into 1,024 elements. The period of the black and white, that is "0" and "1" signals that are produced by comparator 106 may, however, be less than one element in duration.

Black conditioner 110 is effective to eliminate or reject all black or "0" signals less than one-quarter element in duration and to increase all black signals of between one-half and one-element duration to one element. White data conditioner 112, to which the output of black conditioner 110 is applied, expands to one element any white or "1" signal regardless of how narrow that signal may be. The black and white conditioners 110 and 112 are more completely described below. The conditioned data signal is connected by a line 114 to control logic section 28 at the input of fast-slow logic circuit 116 and a data storing shift register 118.

Circuit 116 receives from a system clock generator 120 two clock inputs, one at a fast rate at a line 122, and the other at a slow rate at a line 124. In a typical transmitter the rate of the fast clock may conveniently be 32 times that of the slow clock. As will be more completely described below, logic circuit 116 analyzes the black and white content of the data signals on line 114, and from that data, selects one of the system clocks, i.e., fast or slow. That selected clock is applied by a line 126 to shift register 118 and determines the rate at which data signals initially stored in that register are to be transmitted to the facsimile receiver.

The principle underlying the decision-making operation of circuit 116 is that black data is more meaningful than white data and is thus to be processed and transmitted to the receiver at a slower rate to ensure high resolution of reproduction of the black data at the receiver. However, to increase the speed of image data transmittal and to reduce the necessary transmitting frequency bandwidth, some of the white data is processed and transmitted at a faster rate.

To this end, circuit 116 comprises means to sense when a predetermined number of successive white elements have been scanned on the document and thereupon shifts the system, and particularly the clock input to register 118, from the slow clock rate to the fast clock rate. The system continues to operate at the fast clock rate until the next black element or "1" signal is applied to circuit 116, at which time the system is switched back to operate at the rate of the slow clock.

The fast or slow clock is also supplied by circuit 116 to a digital sweep generator 128, which produces a horizontal sweep control signal at a rate determined by the selected clock. That signal in turn is applied to linearity control circuit 100 and to the horizontal deflection amplifier 92, to thereby vary the rates at which the beam produced by tube 20 horizontally scans the document.

Thus, the analysis of the black-white content of the scanned portion of the document is reflected by a selection of one of the fast or slow clocks. The selected clock rate in turn controls both the rate at which the data signals are processed and transmitted to the receiver, and the rate at which the beam scans the document. That selected rate, as described above, is determined only by the visual content of the scanned image.

Sweep generator 128 comprises means for counting the number of data signals processed by counting the clock signals, since a single line contains a predetermined number of elements, each element being defined by a given number of clock pulses. Generator 128 produces an end-of-line signal each time it counts the proper number of clock signals. That signal actuates unblanking logic circuit 130 which provides an appropriate signal to unblanking circuit 102 to at that time blank the scanning beam of cathode-ray tube 20.

The end-of-line signal also is applied to a step motor command circuit 132 contained in a sequence control section 134. Upon the receipt of the end-of-line signal, circuit 132 produces a stepping signal for step motor 38, causing the latter to incrementally move document 10 to its position for the next scanning operation. The end-of-line signal is further applied to a synchronization code generator 136 which in response to that signal produces a synchronization code signal for the receiver. That code signal instructs the receiver to incrementally reposition the receiving paper for receiving the scanning data signals for the next line.

The end-of-line signal is applied as well to a begin line scan enable circuit 138 which in response thereto and after a time delay to permit the paper to be moved, produces an automatic fast scan override signal at a line 140 which is connected to scan speed decision circuit 116. That signal is effective, in a manner to be described below, to automatically establish an initial fast rate for the initial scanning of the subsequent line, irrespective of the rate at which the last portion of the previous line was scanned. In this manner each line is initially scanned at the fast clock rate and is only shifted to the slow clock rate when black data content is sensed.

When the document is initially placed in the transmitter for scanning and data transmission, a sensing device such as a photo cell (not shown) senses the document insertion and produces a start signal at tone generator and sensor 142 at a line 144. That signal is transmitted to the receiver which is thereby instructed to position a paper to receive scanning data from the transmitter. When the document reaches its final position, that is sensed by a second sensing device in the transmitter (also not shown) which causes generator 142 to produce a stop signal at line 144. The stop signal is sent to the facsimile receiver to cause the latter to stop its operation.

The black/white data signals on line 146 as derived from shift register 118, the start-stop signal on line 144, the fast-slow command signal derived from decision circuit 118 on a line 148, and the synchronization code signals produced by generator 136 on line 150, are respectively applied to the inputs of data and synchronizing combiner 30 which combines the input signals into a three-level transmission data signal illustrated in FIG. 5 which contains all the necessary data and synchronizing information to the receiver.

FIG. 5 illustrates a portion of the transmitted signal for the three possible data conditions. No synchronization signals are shown in FIG. 5, it being understood that the latter precede the transmission of the data signals. A positive or +1 signal 152 is designated to represented a white content to be scanned and printed at the receiver at the rate of the fast clock, the reference or 0 level 154 represents the transmission of white content data to be scanned at the slow clock rate, and the negative or −1 level 156 represents black content data to be scanned in the receiver at the slow clock rate.

That combined transmitter signal produced by combiner 30 are coupled to a hybrid transformer 158, and from there to a modem or modulator-demodulator 160, which processes the three-level data signal for transmission over a conventional telephone wire 162 to the receiver.

The transmitter may also obtain signals from the receiver indicating that the receiver paper is in position to be processed in accord with the received data signals. To inform the transmitter that the receiver paper is in place, a start signal produced at the receiver is returned along line 162 to the transmitter and is coupled through transformer 158 to a start/stop filter 164 (FIG. 3*b*) to remove extraneous information from that signal. The output of filter 164 is applied to a start/stop generator and to an enable circuit 166 which produces at a line 168 an appropriate signal to operate the tone generator 142. When the latter receives a start signal from the receiver, it applies a signal to sequence control 134 to begin a scanning and synchronizing operation similar to when control 134 receives an end-of-line signal from generator 128.

FIG. 6 illustrates in somewhat greater detail the fast slow decision circuit 116 in combination with the data storing shift register 118. In one embodiment of the invention a decision to shift the system data processing rate from a slow to a fast clock rate is made when 32 consecutive white elements are sensed. To this end register 118 stores 32 bits of data, each bit corresponding to a single element of data. Stated differently, the transmitter, if it is operating at the slow clock rate, looks ahead 32 elements before a decision is made, if appropriate, that is when it senses 32 consecutive white elements, to switch system operation to the fast clock rate. If fewer than 32 consecutive white elements are sensed when the system is in the slow rate of operation, a slow white signal is produced, that is the white data signals at this time are processed in the transmitter and transmitted at the rate of the slow clock, and printed at the receiver at the slow rate.

The data signals are applied to the input of register 118 and are transferred out of the register to the receiver at the rate of the selected clock. Since the output of register 118 is always 32 elements behind the data applied to its input stage at line 114, the image data received at the receiver is 32 elements delayed from the data signals produced by the transmitter scanning operation.

The data signals are also applied to a 32-stage counter 170 the output of which is connected to the J-input of a J–K flip-flop 172. The K input of flip-flop 172 is connected to the high or 1 output of a flip-flop 174 which receives the data signals at its input. Flip-flop 172 receives a preset signal at line 140 from enable circuit 138 in response to an end-of-line signal, and is controlled by the slow clock applied at its clock terminal.

The high output of flip-flop 172 represents at line 176 a fast enable signal and the low output of that flip-flop represents at line 178 the slow enable signal. The fast enable signal and the fast clock signals are applied to the inputs of an AND-gate 180, and the slow enable and slow clock signals are applied to the inputs of an AND-gate 182. The outputs of AND-gates 180 and 182 are applied to the inputs of an OR gate 184, the output of which is either the fast or slow clock depending on whether the fast or slow enable signal is present at the inputs of gates 180 and 182.

As noted above, at the beginning of scan on each new line, the transmitter system is operated at the fast clock rate as a result of flip-flop 172 being set by the enable signal on line 140 to unconditionally produce a fast enable signal at line 176. Gate 180 is thus enabled and AND-gate 182 is disabled so that OR-gate 184 receives only the fast clock pulses. Those fast clock pulses are then applied to shift register 118 and counter 170, to thereby determine the rate at which signals are transferred through the stages of those circuits. The system continues to operate at the fast clock rate until a black data signal is received at flip-flop 174, which has its state changed thereby to apply a reset signal at terminal K of flip-flop 172. The latter signal causes flip-flop 172 to change its state to thereby remove the fast enable signal at line 176 and to instead produce a slow enable signal at line 178. At the same time the black data signal resets counter 170 which had previously been counting white data signals to a zero condition.

The presence of the slow enable signal enables AND gate 182, and since the fast enable signal is no longer present, AND-gate 180 is disabled, so that only the slow clock signals are applied to OR gate 184, to register 118, and counter 170. The transfer of the black-white data signals from register 118 thereafter proceeds at the slow clock rate as desired.

Operation of the data signal transmitting system proceeds at the slow clock rate until counter 170 produces at its output a signal which sets flip-flop 172 to its initial state in which it provides a fast enable system. As noted above, this occurs only when counter 170, after being reset to zero by a black data signal, counts 32 consecutive white data signals, at which time it outputs a set signal for flip-flop 172. Upon the termination of the scanning of the line, a signal is again received at terminal R of flip-flop 172 to override the inputs to terminals J and K, thereby to produce a fast enable signal at line 176 irrespective of the input terminal conditions.

In summary, scanning of each line automatically begins at a fast rate and is shifted to a slow rate when the first black data signal is sensed. The data transfer rate remains slow until either 32 consecutive white data signals are counted, or an end-of-line enable signal is applied to terminal R of flip-flop 172.

The sweep generator 128 illustrated in FIG. 7 includes AND-gates 186 and 188 which receive the fast enable and fast clock signals, and the slow enable and slow clocks at their respective inputs. The outputs of gates 186 and 188 are connected to the inputs of an OR-gate 190, the output of which is in turn connected to the input stage of a 10-bit counter 192. Each stage of counter 192 is respectively connected to one input of a 10-stage programmable current source 194. Each current output stage of current source 194 is in turn connected to one of the ten inputs of a resistor ladder network 196. The output of network 196 is connected to the input of an amplifier 198.

Current source 194 comprises ten sources of current which are made operative upon the receipt of a "1" signal from the stage in counter 192 to which they are respectively connected. Each succeeding stage in current source 194 is capable when operative of supplying twice the value of current to network 196 as the immediately preceding stage. Current source 194 and network 196 thus define an effective digital-to-analog converter to produce at the input of amplifier 198, a signal having a level corresponding to the binary count in counter 192.

Counter 192 is of the recirculating type so that, upon completion of a count of 1,024, it is automatically reset to zero, and thus reduces the output of ladder network 196 to zero. The output of network 196 is thus a repeating series of staircase waveforms having a repetition rate determined by the rate at which signals are applied to counter 192, that is, at either the fast or slow clock rate as determined in decision circuit 116. That waveform is amplified in amplifier 198 and applied to the horizontal deflection amplifier 92 of cathode-ray tube 20 to control the scanning rate of the beam produced thereby. In this manner, the selection of the fast or slow clock rate in response to the black-white content of the document also controls the rate at which the document is scanned.

Counter 192 serves yet another function in the system by producing an output or end-of-line signal at line 200 after it counts 1,024 data elements. That signal updates the transmitter and receiver operation in the manner previously described in an earlier portion of the specification.

Data conditioner 84 processes the output data signals from photomultiplier 26 to ensure optimum width signals having a low noise content in the manner outlined above. Since the black data signals are the first to be processed in data conditioner 84, any possible conflict between the black and white data signal conditioners, such as when a half-element black data signal is followed by a quarter-element white data signal is resolved in favor of retaining the black data signal which represents the more significant content of the document.

Black and white data conditioners 110 and 112 are substantially similar in design and manner of operation and differ only in their logical operation. The circuit diagram of FIG. 8 thus represents both data conditioners and is described in that context.

The data conditioners each comprise an input line 202 which is connected to the J terminal of a first J–K flip-flop 204, and through an inverter 206 to the K terminal of flip-flop 204, which thus receives complementary signals at its input terminals. Flip-flop 204 is connected in cascade with J–K flip-flops 208, 210 and 212, each of which also receives a one-quarter element clock signal at its control terminal. The high or "1" output of flip-flops 204, 208, 210 and 212 are connected to the inputs of a logic circuit 214, the output of which is connected to the input of a flip-flop 216 which is clocked by a separate one-element clock signal. The output of flip-flop 216 is a one-element signal at either the black or white data signal level depending on the signal derived at its input from logic circuit 214.

The output signals of flip-flops 204-212 are spaced by one-quarter elements due to their clocking. Thus the logic circuit for the black data conditioner 110, upon the sensing a black data signal at two or more of its inputs, produces an output signal, which in turn produces a one-element black data signal at flip-flop 216. On the other hand, if only one of flip-flops 204-212 produces a black-data signal, indicating the presence of a quarter-element black signal, logic circuit 214 of the black data conditioner generates a signal to set flip-flop 216 to produce a one-element white signal. This, of course, occurs as well if none of the outputs of the flip-flops indicates a black data signal. Logic circuit 214 of white data conditioner 112 thus differs from the one employed in black data conditioner 110 in that upon the sensing of a white data signal at any of the cascaded flip-flops, 204-212, the output of the logic circuit causes flip-flop 216 to output a one-element (white) data signal as desired.

In the facsimile three-level system described above, a changeover from a slow-black to a fast-white mode of transmission or vice versa, is reflected by an abrupt change between −1 level and +1 levels. The receiver logic circuitry which may be responsive to only changes in level may thus not be able to distinguish between a change from a slow-black to a fast-white, i.e., a −1 to a +1 level change, and a change from a slow-black to a slow-white or a −1 to a 0 level change.

To avoid this possible source of ambiguity the reading logic portion 44 of the transmitter is modified according to the schematic diagram of FIG. 9, in which components corresponding to those in FIG. 6 are identified by similar reference numerals. Shift register 118*a* is, as in the previous embodiments, a 32-element register, and is followed in the FIG. 9 embodiment by an additional three-element shift register 218. Counter 170*a* is in this embodiment a 37-element counter rather than a 32-element counter as before.

The operation of the fast-slow decision circuit is similar to that described above. Data signals are applied to the inputs of register 118*a* and counter 170*a*. When the latter receives a full complement, that is, 32 consecutive white data signals, it produces an output signal which sets flip-flop 172 to output a fast command signal at line 176. However, the combined capacity of registers 118*a* and 218 is only 35 elements as compared to the 37 consecutive white elements required to produce a fast enable signal. As a result, for a data signal condition of 37 consecutive white data signals following one or more black data signals, the initial two white signals outputted from register 218 occur while the output of flip-flop 172 controlled by the output of counter 170*a* is still a slow enable signal; following that counter 170*a* produces a reset signal for flip-flop 172 to thereupon produce a fast enable signal. The two element slow-white signal between the slow-black and fast-white signals define a transitory guard-band condition between the fast and slow modes of transmitter operation to prevent the possible receiver ambiguity noted above.

The output waveform of the transmitter for this situation is illustrated in FIG. 10, in which data combiner 30 initially produces a 220 *a* −1, or black signal. The initial two white data, or 0 signals at 222 represent the guard-band or slow-white signals outputted from register 218 prior to the establishment of the fast mode. The latter condition is illustrated at 224 by the fast-white or +1 signal, separated from the slow-black or −1 signal 220 by the two-element guard-band 222 as desired. The duration of guard-band 222 may be varied by varying the difference in the number of stages in counter 170*a* and the combined stages in shift registers 118*a* and 218.

Two-Level Data Transmission System

The facsimile system so far described produced a data signal on telephone line 162 which has three possible levels; the +1 level for fast-white transmission, the 0 level for slow-white, and the −1 level for slow-black transmission. The facsimile system of the present invention may be modified if desired to transmit the desired black-white and fast-slow information all within the context of a two-level data signal transmission system. The basis for the system is the establishment of a unique two-level code to instruct the receiver to switch to the fast mode of operation. As herein described, that unique fast command code comprises a black element, followed by two white elements and then followed by another black element. In order for the system to operate, all data signals having this BWWB pattern for a fast command code must be rejected or modified so that whenever that pattern appears at the receiver, the receiver automatically is switched to its fast mode of operation. The rejection of the image data having the unique fast command code is achieved in a modified version of the data conditioner 84 illustrated in FIG. 11 which, upon the sensing of the forbidden BWWB data sequence, converts that sequence into a BBWB sequence.

In that modified data conditioner data signals from photomultiplier 26 are applied to the first stage of a majority decision circuit which periodically produces at its output a one-element black or white data signal based on an analysis of the previous four quarter-element data signals. For a majority of black over white quarter-element data signals or vice versa, a one-element black (or white) data signal is produced. For two-quarter black and two-quarter white data signals, the circuit produces a one-element black data signal. As illustrated in FIG. 11 that circuit comprises a first series of cascaded flip-flops 226, 228, 230 and 232, each of which is controlled by a quarter-element clock. The high outputs of these flip-flops, which are either black or white quarter-element signals, are connected to a majority logic circuit 234 which in turn produces an output signal based on the respective states of these outputs. The latter output signal, which corresponds to either a black or a white signal, is applied to the input of a flip-flop 236, which in turn is cascaded with flip-flops 238, 240 and 242 to define a four-stage shift register. A logic circuit is connected between flip-flops 240 and 242 and has the "high" outputs of flip-flops 236–242 applied as its inputs. Flip-flops 236–242 are all clocked by one-element clocks.

When the inputs to logic circuit 244 correspond to the "forbidden" BWWB data signal sequence, that is, the unique fast command code, circuit 244 inhibits the transfer of the second white (W) data signal, so that the output of the four-stage shift register is in the form of a BBWB data sequence, which is transmitted in that form to the receiver, where it may be reconverted and printed in its original BWWB sequence.

The fast-slow decision circuit which produces the unique fast command code when an appropriate number of consecutive white elements are counted, is illustrated in FIG. 12 which is similar to FIG. 9 with the exception that an AND-gate 246 has one of its inputs connected to the output of shift-register 218*a*. The other input to gate 246 is the slow enable signal produced by flip-flop 172 at line 178 when the system is operating in the slow mode.

In operation, when the system receives a black signal, flip-flop 172 is reset to produce a slow enable signal and AND-gate 246 is thereby enabled. Any sequence of black and white, (1 and 0) signals are sequentially outputted from shift register 218 at the slow clock gate to gate 246 in the form of a train of either slow-white or slow-black signals, it being recalled that the unique BWWB sequence is prohibited by the data conditioner from the transmitted image data.

When, however, counter 170*a* counts a predetermined number, e.g., 37, of white elements, it reset flip-flop 172, thereby to produce a fast enable signal at line 176 and remove the slow enable signal, thereby disabling gate 246 and establishing the output of that gate unconditionally at ground. Since the element storing capacity of registers 118*c* and 218 is two elements less than the counting capacity of counter 170*a*, two white elements will be outputted by gate 246 prior to its disabling. Thus for a fast command mode, the output of gate 246 is the desired unique code of a series of "black" signals, that is signals at the 0 level. The latter 0 level signals, since they follow the unique two unit element fast command code, represent a fast-white command to the receiver even though those signals are of the normally 0 or black data level.

The receiver when it receives these signals, senses the fast-command code, and proceeds to print white data at the fast rate, until the command is received to revert its operation to the slow mode. This will occur upon the receipt of the next black element signal at which time flip-flop 172 is once again reset in the manner described above to produce a slow enable signal at line 178, causing gate 246 to be once again enabled. The output of that gate, once the system is in the slow mode, may be as noted above either a black or a white element. Those elements are transmitted at the slow rate to the receiver in which they cause corresponding black or white elements to be printed or otherwise reproduced at the slow rate. Thus, as desired, a two-level, 1 or 0, output can provide three distinct commands to the receiver to scan black, or to scan white at either a fast or a slow rate.

Facsimile Receiver

The block diagram of the facsimile receiver of the invention is illustrated in FIG. 4 for receiving and processing image and fast-slow data from the transmitter of FIG. 3. The receiver specifically illustrated in FIG. 4 is adapted for use in the three-level data transmission scheme described above, but it can be readily modified for compatibility with the two-level data transmission scheme as will be described.

The signals transmitted by the transmitter over the telephone line are received at a hybrid 250 located in the line interface portion 252 of the receiver, and are then applied to the inputs of an amplifier and level detector 254 and a clock synchronizer 256, the latter being located in the printing logic portion 258 of the receiver.

Amplifier and level detector 254 senses the +1 and −1, to wit, fast-white and slow-black command levels and applies them to the corresponding + and − inputs of a data synchronizer 260 in which the image black-white data, scan rate data, and synchronizing signals are extracted.

The output of hybrid 250 is also applied to the input of clock synchronizer 256, which in turn is connected to a system clock and end tone generator 264. Clock synchronizer 256 in combination with the clock generator 264 define a phase-locked loop which synchronizes the receiver clock pulses with the transmitter clock pulses received from the modem 160. Synchronized clock signals are applied from clock generator 264 to data synchronizer 260 to control the data processing operation of the latter.

The various output data signals from data synchronizer 260 are applied to an inhibit code recognition circuit 266, a step command circuit 268, a fast/slow decision circuit 270, and a white/black data circuit 272. The step command circuit, which corresponds to the paper advance 74 in FIG. 2, responds to begin line scan signals obtained from the transmitter to produce a step signal to move the receiving copy 50 one incremental step for each new line of scanning. Those step signals are applied to step motor 72 to move the copy 50 to its next position for scanning. The step signals are also applied to a step counter 274 which counts the number of those signals and thus the number of lines scanned and printed on copy 50. When counter 274 counts a predetermined number of lines corresponding to a complete page of copy, it transmits an end of copy count to a start/stop decoder logic circuit 276.

The fast/slow decision circuit 270 produces a fast command signal at line 278 of a slow command signal at line 280 in response to the polarity of the fast/slow data signal derived from data synchronizer 260. Those signals are applied to a digital sweep generator 282 which is similar to the sweep generator 128 in the transmitter and illustrated in greater detail in FIG. 7. Sweep generator 282 produces a smooth sweep signal at either a fast or a slow rate in response to which command signal is applied thereto.

That signal is applied through a linearity correction circuit 284 and through a horizontal deflection amplifier 286 to the deflection system 288 of receiver cathode-ray tube 48, to in turn control the rate at which the cathode-ray beam is scanned over the copy sheet 50. Thus, as desired, the scan image data and rate command signals derived at the transmitter in response to the content of the scanned image is reflected in the rate at which that image is reproduced on the copy at the receiver. The output of linearity correction circuit 284 is also applied through a dynamic focus control circuit 290 to the beam focusing system 292 of tube 48. Focusing system 292 also receives a static control signal from a static focus control circuit 294.

The copy data from data circuit 272 is in the form of a black data signal which when present is applied over a line 296 to a CRT unblanking circuit 298, so that the cathode-ray tube beam is blanked each time a white data signal is to be printed, the beam thus being present only for "printing" black areas on the copy. The vertical position of the scanning beam is controlled by a signal applied to the tube deflection system from a vertical position control circuit 300 which in turn receives a dither signal from a dither generator 302, the latter being energized by a signal obtained from block generator 264. The dither in the beam serves to improve the vertical resolution of the finished printed copy.

An operating anode potential for tube 48 is provided by a high voltage power supply 304. As in the transmitter, tube 48 is protected by a phosphor protection circuit 306, which turns off the power supply when it receives signals from sweep generator 282 and unblanking circuit 298 to the effect that the beam is unblanked and is not scanning.

Inhibit code recognition circuit 266 inhibits the operation of sweep generator 282 in response to signals derived from sweep generator 282 as in the transmitter sweep generator, during periods between lines, that is, when the copy is being moved to its next position for scanning and printing.

The tones generated in transmitter tone generator and sensor 142 in response to the positioning of document 10 for the initiation of an image transmission are received at a start/stop signal detector 308, which in response to those signals produces a feed paper signal at a line 310 at the beginning of an image transmission to place new paper in position for scanning at the receiver. That signal is transmitted through logic circuit 276 to the feed paper drive 74. When the paper is properly positioned in the receiver this is sensed by paper in place contacts 312 to transmit a signal through decoder logic 276 and line 314, to a line interface amplifier 316 and from there through hybrid 250 and over the telephone line to line 168 and tone generator 142 in the transmitter. When the scanning of the document 10 in the transmitter is completed a corresponding end of copy signal is sent to the receiver, and causes detector 308 to produce an end of copy signal at a line 318. The end of copy signal is also decoded in circuit 276 and applied to end of copy circuit 320 which causes the receiver to complete its scanning and printing operation.

The receiver for use with a two-level data transmission system is substantially that shown in FIG. 4 for a three-level data system. In the two-level system, data synchronizer 260 receives only one input from detector 254. The fast-slow decision in a two-level system is made at circuit 270 from the received unique BWWB fast command code by the circuit illustrated in FIG. 13.

That circuit comprises cascaded J–K flip-flops 322, 324, 326 and 328, each of which is controlled by one-element clock signals. The high outputs of these flip-flops are connected to the inputs of a logic circuit 330, which upon the sensing of the fast command sequence, that is a black or low output at flip-flops 322 and 328, and a white or high output at flip-flops 324 and 326, produces a signal at line 332. That signal in turn, is effective to reset a flip-flop 334, which is controlled by a one-element clock, causing the latter to produce a fast command signal at its high output 336. For all other output conditions at flip-flops 322–328, logic circuit 330 produces a reset signal at line 338 which when applied to the K-input of flip-flop 334, causes it to produce a slow command signal at its low output at line 340.

The black-white data circuit 272 in the two-level receiver comprises a circuit similar to that shown illustrated in FIG. 11 in which a received data sequence of BBWB (which it will be recalled results when the data obtained by scanning the document is the unique BWWB sequence), is reconverted to the latter data sequence. In the receiver circuit the logic circuit which performs this data conversion corresponds to the transmitter logic circuit 244 illustrated in FIG. 11 which upon the detecting of the BBWB sequence converts the second black signal to a white signal, rather than inhibiting the first white signal as in the corresponding circuit in the transmitter. In this manner the receiver is able to recognize the fast command code to cause the beam of cathode-ray tube 48 to be scanned at the fast rate, while still being able to recognize and print out that code when it appears in its modified form as a data signal.

The facsimile system of the present invention thus enables highly improved performances with respect to high speed of image transmission and processing, as well as reduced bandwidth requirements enabling the transmitter to be connected to the receiver over conventional telephone lines. Moreover, the copy produced at the receiver is of high resolution and is compatible with practically all commercial requirements for clarity and legibility.

Synchronization between the transmitter and receiver data circuitry is ensured and simplified as a result of the essentially digital nature of operation of the system. The transmitter in response to the black-white content of the scanned copy generates either a slow or fast command which causes data to be transmitted to the receiver and the copy to be scanned at the selected rate. The scan rate command is also applied to the receiver to control the rate at which it scans and prints the copy. Thus by scanning rapidly over white areas i.e., areas having no meaningful content, and slowly over black areas, the required system bandwidth is reduced, and the speed of system operation is increased.

The system requires relatively simple circuitry and is thus relatively inexpensive and highly reliable. For example, the requirement that only a small amount of data be stored in the transmitter reading logic section as compared to prior art variable scan systems, significantly reduces the complexity of that section of the transmitter.

As herein described, the system may operate to transmit its data and rate command signals at either two or three-level signals. Other schemes may also be implemented by minor modifications to the system, such as the development of two-bit binary words for the three basic data and rate signals, slow-black, slow-white, and fast-white.

Thus, while only several embodiments of the invention have been herein specifically described, it will be apparent that many modifications may be made therein all without departing from the spirit and scope of the invention.

We claim:

1. A system for transmitting signals derived by the scanning of a document or the like having light and dark areas thereon, said system comprising means including a control terminal and a signal terminal for deriving at said signal terminal data signals at one of two discrete levels corresponding respectively to the dark and light areas on the document, an output terminal, signal storing means having input and output stages, said output stage being coupled to said output terminal, means coupled to the signal terminal of said data signal deriving means for selecting one of a first and second different data rates, said second data rate being a multiple of said first data rate, means coupled to the signal terminal of said signal deriving means for applying said data signals to the input stage of said storing means at the selected one of said first and second rates, and means coupled to said rate selecting means and said storage means for reading out the previously stored data signals from said output stage of said storing means to said output terminal at the selected one of said first and second rates simultaneous with the application of said data signals to the input stage of said storing means at said selected one of said first and second rates.

2. The system of claim 1, in which said signal-deriving means comprises means for scanning the document with a beam, and means in operative optical communication with said scanning means for producing said data signals, said system further comprising means coupled to said rate determining means and said scanning means for operating said scanning means at one of first and second different rates.

3. The system of claim 2, in which said rate selecting means comprises first and second sources of timing signals at said first and second rates respectively, means for counting a predetermined number of said data signals at one of said levels, and gating means operatively controlled by said counting means for applying one of said first and second timing signals to said signal storing means for determining the rate of signal readout therefrom.

4. The system of claim 3, in which said scanning rate means comprises second counting means receiving input signals at one of said first and second rates, and scan signal generating means coupled to said second counting means for producing scanning signals at a rate corresponding to the rate of said input signals.

5. The system of claim 4, in which said second counting means is also effective when a second predetermined number of input signals is applied thereto to produce an end of line signal for controlling the position of said document.

6. The system of claim 4, further comprising means for sensing the completion of the scanning of a line, and means responsive to said line completion sensing means for initiating scanning on the succeeding line on the document at the faster one of said first and second rates.

7. The system of claim 6, in which said rate determining means further comprises means for delaying by a predetermined period the changeover in said data transferring rate from said first rate to said second rate and vice versa.

8. The system of claim 7, in which said storing means comprises a first number of data storing units, and said counting means comprises a second number of stages, said delay period being determined by the difference between said second and first numbers.

9. The system of claim 8, further comprising means for generating a three-level output signal corresponding to the selected data transfer rate and level of the transmitted data signal.

10. The system of claim 7, comprising means for generating a unique sequence of signals at first and second levels whenever a predetermined one of said first and second data transferring rates is selected.

11. In combination with the system of claim 10, a facsimile receiver coupled to said transmitter output terminal and comprising second scanning means, and means responsive to signals derived from said transmitting system for operating said second scanning means at the selected one of said first and second rates.

12. The system of claim 1, in which said signal rate selecting means comprises first and second sources of timing signals at said first and second rates respectively, means for counting a predetermined number of signals at one of said levels, and gating means operatively controlled by said counting means for applying one of said first and second timing signals to said storing means for determining the rate of signal transfer therefrom.

13. The system of claim 2, further comprising means for sensing the completion of the scanning of a line, and means responsive to said line completion sensing means for initiating scanning on the succeeding line on the document at the faster one of said first and second rates.

14. The system of claim 12, in which said predetermined number of signals is equal to the ratio of the higher one of said first and second rates to the lower one of said first and second rates.

15. The system of claim 1, in which said rate-determining means further comprises means for delaying by a predetermined period the changeover in said data-transferring rate from said first rate to said second rate and vice versa.

16. The system of claim 15, in which said storing means comprises a first number of data storing units, and said counting means comprises a second number of stages, said delay period being determined by the difference between said second and first numbers.

17. The system of claim 1, comprising means for generating a rate command signal consisting of a unique sequence of signals at first and second levels whenever a predetermined one of said first and second data transferring rates is selected, and means for combining said two level rate command signal with said rate command signal at said output terminal.

18. The system of claim 17, in which said predetermined one of said rates is the faster of said rates.

19. In combination with the system of claim 18, a facsimile receiver coupled to said transmitter output terminal and comprising second scanning means, and means responsive to said unique rate command signal derived from said transmitting system for operating said second scanning means at the selected one of said first and second rates.

20. In combination with the system of claim 2, a facsimile receiver coupled to said transmitter output terminal and comprising second scanning means, and means responsive to signals derived from said transmitting system for operating said second scanning means at the selected one of said first and second rates.

21. The system of claim 1, in which said data signal deriving means comprises means for scanning the document, means for sensing the reflected beam from the document and for producing a corresponding analog signal, means coupled to said analog signal producing means for producing from said analog signal a binary signal at two discrete different levels, and signal conditioning means including logic means coupled to said binary signal producing means for sensing whenever the period of said binary signal at one of said discrete levels is below a predetermined minimum resolution value, and means coupled to said sensing means for expanding the duration of said binary signal to a conditioned signal of said minimum resolution duration at said one of said discrete levels.

22. The system of claim 2, in which said scanning means comprises a cathode-ray tube having deflection means, and further comprising means for providing an unblanking signal to said tube, a power supply for said tube, means for providing a deflection signal to said deflection means, and gating means having inputs coupled to said unblanking signal providing means and said deflection signal providing means, and an output coupled to said power supply, and effective upon receiving predetermined signals from each of the former to deactuate the latter.

23. A method for transmitting a copy of an image from an image transmitter to an image receiver, said method comprising the steps of at said transmitter, sequentially scanning substantially equal linear portions of the image to produce a series of image data signals at one of two binary levels, respectively corresponding to the dark and light portions of the image, the number of said image data signals derived from each one of said linear portions being substantially equal, processing said image data signals to generate a fast or a slow scanning rate command signal consisting of a predetermined two-level unique combination of signals at the same levels as said image data signals upon the sensing of a predetermined consecutive number of said image data signals of one of said binary levels that may appear at any arbitrary location in said series of said image data signals, said predetermined number of image data signals being less than the number of said image data signals produced by scanning one of said linear portions, interposing said unique two level scanning rate command signal into said series of image signals to produce a single train of two-level signals in which said two-level scanning rate command signal appears within said signal train when said predetermined consecutive number of image data signals is sensed, and transmitting the combined two-level rate command and image signal train; and at the receiver, sensing from the received two-level signal train the transmitted scan rate command signal, and thereafter processing the received image signals at a fast or slow scanning rate corresponding to the sensed scanning rate command signal.

24. The method of claim 23, further comprising the step of scanning at said transmitter the image at the selected one of said rate command signals.

25. The system of claim 21, in which said signal conditioning means further comprises second logic means coupled to the output of said first-mentioned logic means for sensing the duration of said binary signal at the other of said discrete levels below a second minimum resolution value, and means for deriving from said below minimum duration signal a conditioned signal at said second minimum resolution duration at said other of said discrete levels.

* * * * *